Dec. 27, 1938. W. A. MEEKS 2,141,358

FLUID PRESSURE BRAKE

Filed April 4, 1936 3 Sheets-Sheet 1

INVENTOR
WILLIAM A. MEEKS
BY HIS ATTORNEYS
Howson and Howson

Dec. 27, 1938.                W. A. MEEKS                2,141,358
                          FLUID PRESSURE BRAKE
                        Filed April 4, 1936          3 Sheets-Sheet 2
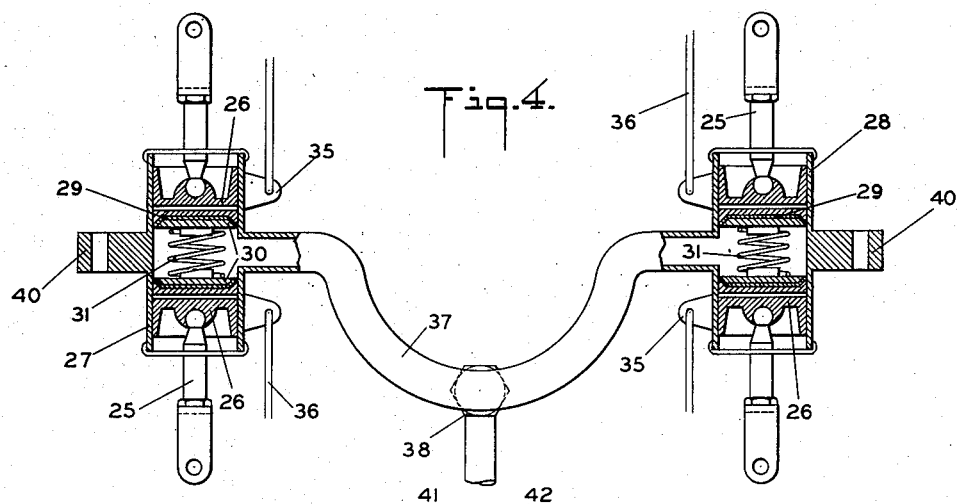
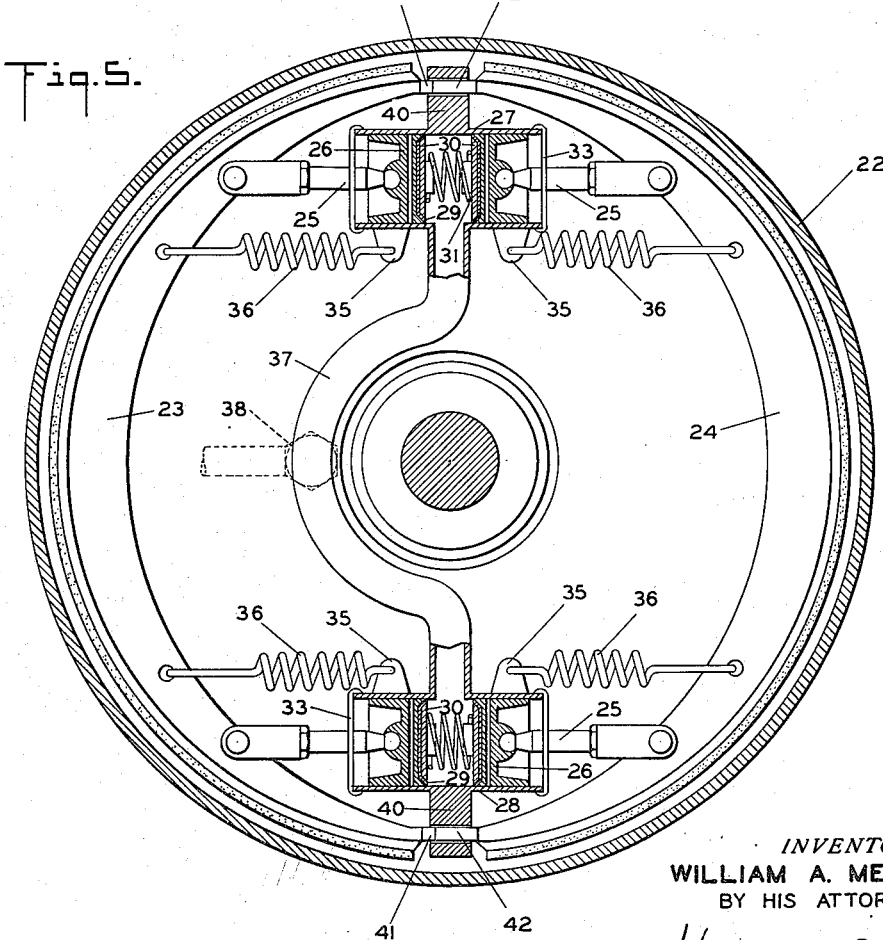
INVENTOR
WILLIAM A. MEEKS
BY HIS ATTORNEYS
Howson and Howson Dec. 27, 1938. W. A. MEEKS 2,141,358
FLUID PRESSURE BRAKE
Filed April 4, 1936 3 Sheets-Sheet 3
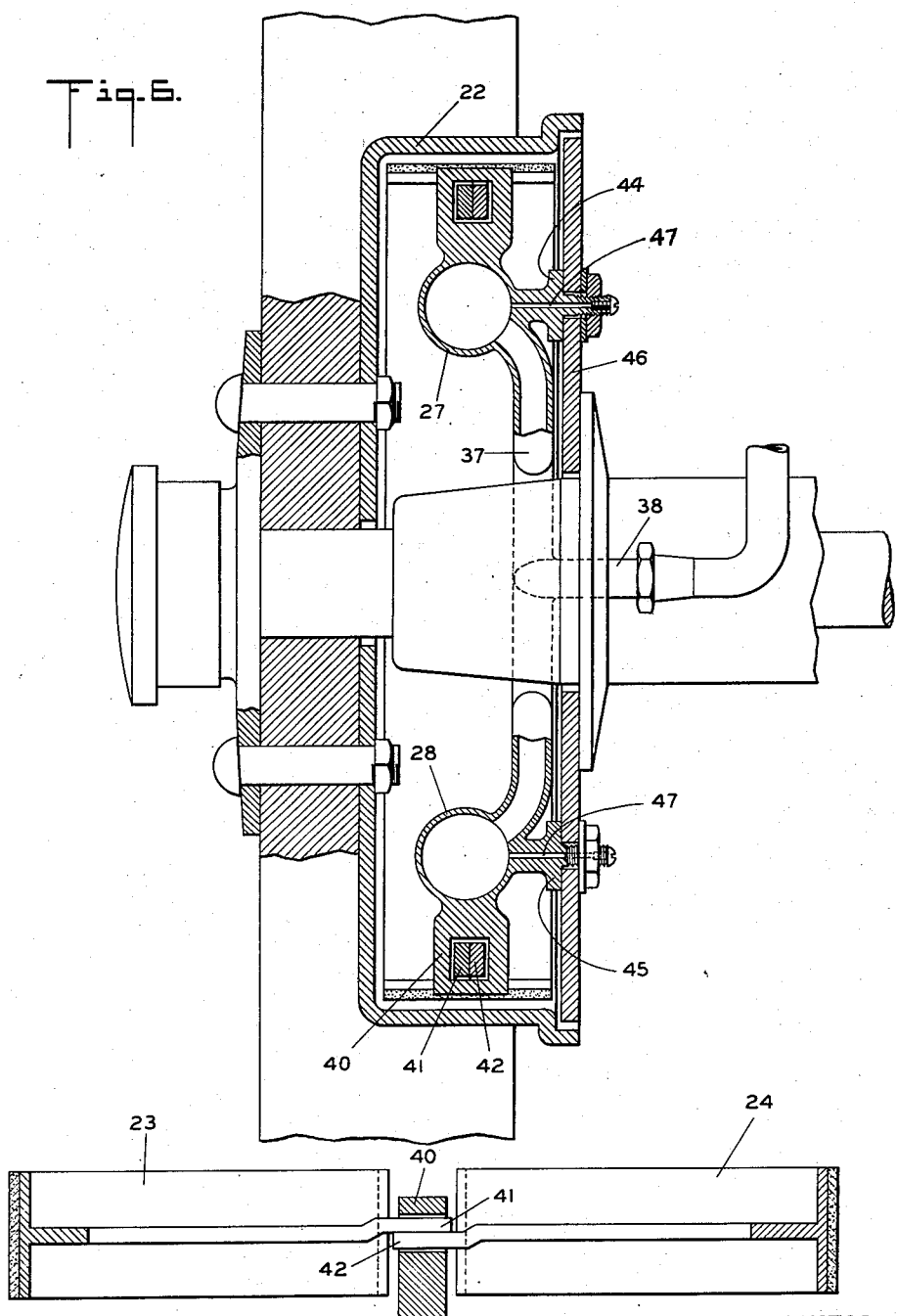
INVENTOR
WILLIAM A. MEEKS
BY HIS ATTORNEYS Patented Dec. 27, 1938

2,141,358

UNITED STATES PATENT OFFICE 2,141,358

FLUID PRESSURE BRAKE

William A. Meeks, Glendale, N. Y.

Application April 4, 1936, Serial No. 72,788

4 Claims. (Cl. 188—152)

This invention relates to fluid pressure brakes, and more particularly those of the four wheel type for automotive vehicles.

While hydraulic brakes have many advantages for installations of this character, they are attended by the disadvantage of being subject to leaks, which of even small size and duration may render the entire hydraulic brake system inoperative.

The main objects of the present invention are therefore to decrease the possibility of leaks, and to decrease the undesirable effects thereof, particularly to minimize the number of joints in the system and to maintain operative braking on certain of the wheels even though a leak should occur in the piping between the master cylinder and the brake cylinders for the remaining wheels.

Further objects are to simplify and improve the construction and operation of devices of this character, to render them economical to manufacture, convenient to install, reliable in action, and otherwise well adapted for the purposes set forth.

Other objects will be apparent from the following description and the accompanying drawings, in which Figure 1 is an elevation partly in vertical section through a portion of an automobile frame, showing the master cylinder device according to the preferred embodiment of the present invention;

Figure 4 is a detail of the pressure responsive brake cylinder casting;

Figure 5 is an end elevation, partly in section, of the mechanism in the brake drum;

Figure 6 is a vertical axial section through the brake drum and parts of the wheel; and Figure 7 is a horizontal section through the brake shoes.

As is customary in fluid pressure brake systems, pressure is generated in a pressure applying device under manual or servo control of the operator, and distributed by the conduit system to pressure responsive devices associated with the several brakes. The preferred embodiment of the present invention is intended for use in four wheel hydraulic brakes for automotive vehicles, and comprises a master cylinder device from which pressure is distributed through pipes to brake cylinders associated with shoes engaging the respective brake drums.

Figure 1:
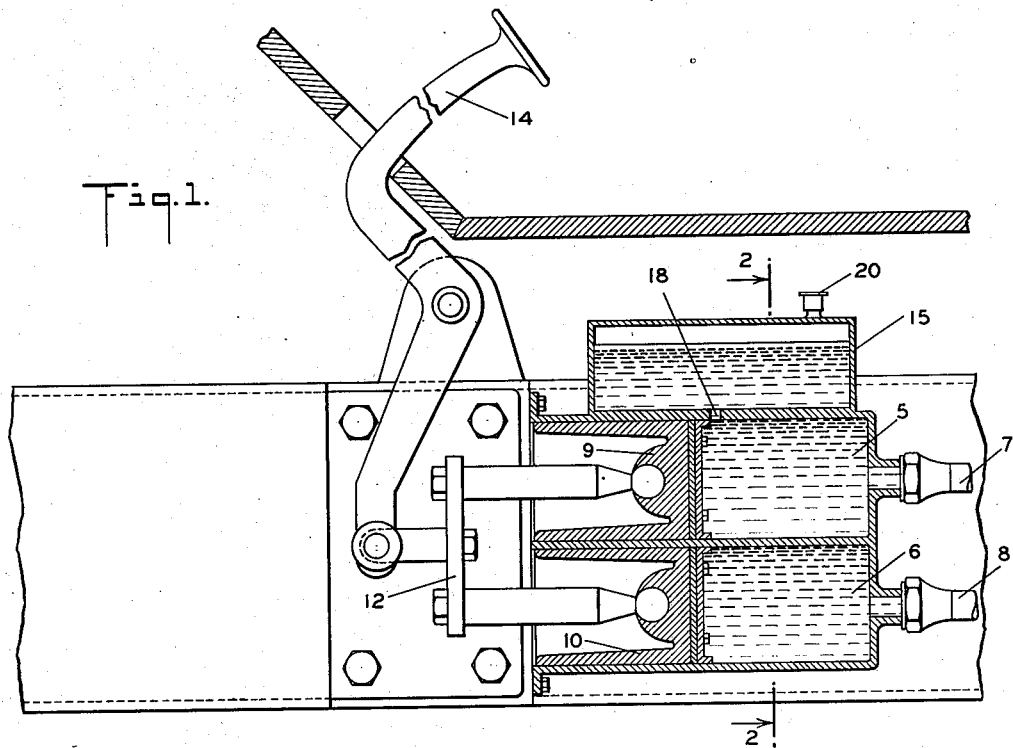
Figures 2, 3:
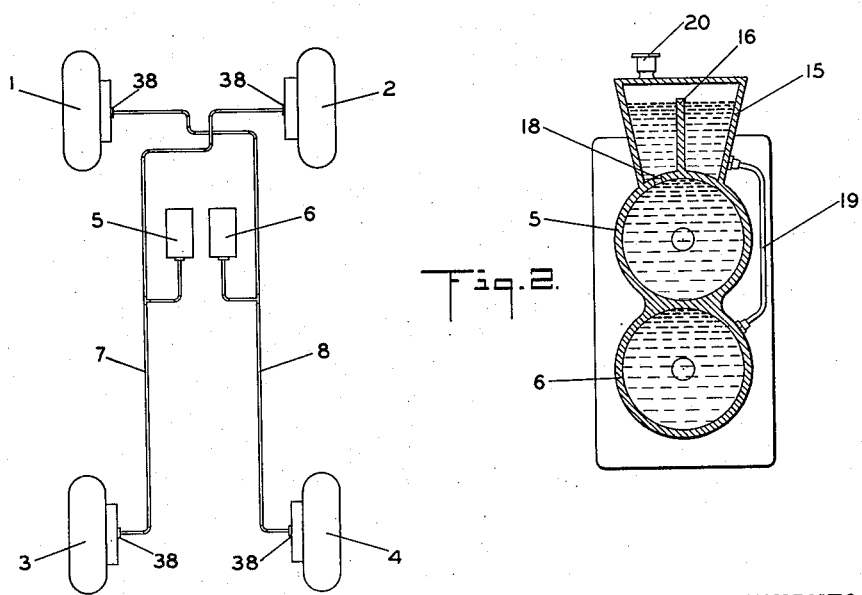
Figure 2 is a vertical transverse section through the master cylinder device, taken along the line 2—2 of Figure 1.
Figure 3 is a diagram of the conduit connections of the hydraulic brake system.

In Figure 1 a double master cylinder device is shown, comprising cylinders 5 and 6, which while preferably cast en bloc as to structure, are non-communicating and independent as to fluid supply distribution. As shown in Figure 3, the master cylinder 5 is connected to a conduit 7 which leads to the brake device for the right front wheel 2 and the left rear wheel 3, while the master cylinder 6 is connected to a conduit 8 which leads to the brake devices of the remaining left front wheel 1 and right rear wheel 4.

The pistons 9 and 10 for these master cylinders are intended for simultaneous operation, and in the form shown in Figure 1 these pistons have rods bolted to a yoke 12 which is connected to the foot brake lever 14. When the pedal is depressed, both pistons are forced into their cylinders with the same force and speed, thereby generating the same pressure in the conduits 7 and 8. If a leak has developed in the conduit 7 sufficient to partly drain the fluid therefrom and prevent pressure actuation of the brakes for wheels 2 and 3, the conduit 8 is not affected thereby, but instead transmits the pressure from master cylinder 6 to the brake cylinders for wheels 1 and 4. Conversely, a leak in conduit 8 would leave conduit 7 intact, for braking on wheels 2 and 3.

It will be understood that the front wheels 1 and 2 are dirigible, as these are the wheels by which a vehicle is steered. The rear wheels 3 and 4 are coaxial, and it is these wheels by means of which the power of the vehicle motor is applied for propelling the same. However, a front wheel drive arrangement would not be interfered with by the present braking system, and hence this diagram embraces the condition in which the front wheels 1 and 2 are tractive as well as dirigible wheels.

It should be noted that the braking effects of the two conduits are equal. This would also be true if wheels 1 and 3 were interconnected separately from wheels 2 and 4, but in that event the braking effect would be all on one side, which might tend to skid crosswise the road. If the front wheels were interconnected separately from the rear wheels, the braking effect would be unequal because if the front wheels were disabled, the rear wheels would merely be equivalent of the usual two wheel brakes, but if the rear wheels were disabled, the car might tend to somersault over the front wheels, or swing around the same laterally. However, so long as the braking on at least one wheel is preserved, when the other wheels are disabled, a material advantage is gained.

The master cylinders 5 and 6 are provided with independent reservoirs and automatic means for replenishing the fluid in the conduits connected to the respective master cylinders. In the form shown a tank 15 is cast en bloc with the walls of the master cylinders 5 and 6, and is provided with a partition 16 dividing the tank into two separate reservoirs. The master cylinder 5 has a supply aperture 18 entering one of these reservoirs, and located at the end of the suction stroke of the piston 9. The master cylinder 6 has an aperture similarly located, but connected by a pipe 19 to the other reservoir. The partition 16 terminates short of the top of the tank 15, so that both tanks may be filled through a cap 20, which is provided with an air bleed orifice to break the vacuum in the tank.

When the pistons 9 and 10 are at the end of the suction stroke, in the position shown in Figure 1, the ports 18 and 19 are uncovered, thus permitting any fluid required to fill the respective conduit systems, to run into the master cylinder by gravity. When the pedal 14 is depressed and the pistons 9 and 10 start on their pressure strokes, the pistons cover the ports 18 and 19 and thus trap the brake fluid in the respective conduits, for transmitting the master cylinder pressure to the brake cylinders.

The respective wheels of the vehicle are each provided with a brake drum 22 as shown in Figures 5 and 6. The brake shoe structure therewithin is preferably of the internally expanding type. In the form shown, each brake drum has two brake shoes 23 and 24 therewithin, which are oppositely disposed but of equal size.

The upper and lower portions of brake shoes 23 and 24 are respectively pivoted to a connecting rod 25 in turn pivoted to a piston 26. The upper pistons enter the opposite ends of a double acting cylinder 27 while the lower pistons are similarly disposed in a lower cylinder 28. These pistons are each provided with a cup leather or washer 29, which is held in place by a conical retainer member 30. A spring 31 is interposed between the two members 30 in each cylinder and urges the same apart. The outer ends of the cylinders are closed by flexible dust excluding coverings 33, which may be of rubber, leather or annularly corrugated sheet metal. Each end of each cylinder is provided with an eye 35 receiving a tension spring 36 for retracting the brake shoes.

The walls of the cylinders 27 and 28 are cast en bloc with a connecting part 37, which is cored to provide an intercommunicating passage between the two cylinders, which passage is provided with a fluid pressure inlet 38. The connecting part 37 being all one piece with the two cylinders 27 and 28 not only avoids labor expense of pipe joints, but also avoids the attendant possibility of leakage. Also cast en bloc with the cylinder walls are guide lugs 40 each provided with a guide aperture receiving terminal lugs 41 and 42 of the brake shoes 23 and 24.

It should be noted that the brake shoes are full floating, in that while the guide lugs 40 confining the terminal lugs 41 and 42 prevent the same from getting out of alignment, the brake shoes have no anchorage to interfere with their receiving full uniform pressure for braking, and also full release.

It will be readily understood that the ends of the respective conduits 7 and 8 are connected to the fluid inlets 38 for the respective wheel units, according to the diagram of Figure 3. The fluid pressure entering the inlet 38 is transmitted through the intercommunicating passage 37 to both cylinders 27 and 28 and urges the pistons 26 therein apart in opposite directions with equal force. Accordingly the upper and lower parts of each brake shoe engages the brake drum 22 with an equalized pressure which is the same as that applied to the other brake shoe, but in the opposite direction.

Also cast en bloc with the cylinders 27 and 28 respectively are bearing pads 44 and 45 having attaching bolts which pass through apertures in the stationary cover and supporting plate 46. These bolts are each provided with a central passage 47 therethrough which has a removable closure and forms an air bleed for the cylinders.

It is a particular advantage of this construction that the essential connections are all outside of the supporting cover plate 46, as the inlet 38 projects therethrough. This cast en bloc arrangement also permits the entire fluid pressure responsive mechanism for each wheel to be assembled by attachment at two points only, comprising the bolts 44 and 45. The air bleed passage 47 passing through the bolts 44 and 45 renders the air bleeding accessible from the outside of the supporting and cover plate 46.

This invention embraces such embodiments of this disclosure as fall within the scope of the following claims.

I claim:

1. In a fluid pressure brake, a brake drum, an axle centrally disposed with respect to said brake drum, a pair of oppositely disposed brake shoes inside said brake drum, a pair of cylinders respectively mounted between said brake shoes on opposite sides of said axle, a pair of oppositely disposed pistons in each of said cylinders, means for respectively transmitting the forces of said pistons to said oppositely disposed brake shoes at points equidistant from the centers thereof, the walls of said cylinders having a connecting part cast integral therewith extending around said axle, said connecting part having a passage communicating with both of said cylinders and provided with a single inlet whereby the same pressure is transmitted to all four of said pistons, the wall thicknesses of said cylinders and said connecting part being substantially uniform and substantially equal, said integral casting eliminating joints and consequent leakage between said connecting part and said cylinders.

2. In a fluid pressure brake, a brake drum, an axle centrally disposed with respect to said brake drum, a pair of oppositely disposed brake shoes inside said brake drum, a pair of cylinders respectively mounted on opposite sides of said axle and between said brake shoes, a pair of oppositely disposed pistons in each of said cylinders, means for respectively transmitting the forces of said pistons connected to said oppositely disposed brake shoes at points equidistant from the centers thereof, the walls of said cylinders having a connecting part integral therewith extending around said axle, said connecting part having a passage communicating with both of said cylinders and provided with a single inlet whereby the same pressure is transmitted to all four of said pistons, and parts respectively integral with the outwardly disposed walls of said cylinders forming guides respectively cooperating with adjacent ends of both brake shoes.

3. In a fluid pressure brake, a brake drum, an axle centrally disposed with respect to said brake drum, a pair of oppositely disposed brake shoes inside said brake drum, a pair of cylinders respectively mounted on opposite sides of said axle and between said brake shoes, a supporting plate having two spaced apertures, attaching means connected to the respective walls of said cylinders and passing through said apertures respectively, a pair of oppositely disposed pistons in each of said cylinders, means for respectively transmitting the forces of said pistons to said oppositely disposed brake shoes at points equidistant from the centers thereof, the walls of said cylinders having a connecting part integral therewith extending around said axle, said connecting part having a passage communicating with both of said cylinders and provided with a single inlet whereby the same pressure is transmitted to all four of said pistons, one of said attaching means having an air bleed passage therethrough, and closure means outside of said plate for terminating said passage.

4. In a fluid pressure brake, a brake drum, an axle centrally disposed with respect to said brake drum, a pair of oppositely disposed brake shoes inside said brake drum, a pair of cylinders respectively mounted on opposite sides of said axle and between said brake shoes, a supporting plate having two spaced apertures, attaching means connected to the respective cylinder walls of said cylinders and passing through said apertures respectively, a pair of oppositely disposed pistons in each of said cylinders, means for respectively transmitting the forces of said pistons to said oppositely disposed brake shoes at points equidistant from the centers thereof, the walls of said cylinders having a connecting part integral therewith extending around said axle, said connecting part having a passage communicating with both of said cylinders and provided with a single inlet whereby the same pressure is transmitted to all four of said pistons, said cylinders each having guides integral with the centres of the outer portions thereof receiving terminal lugs of both brake shoes.

WILLIAM A. MEEKS.